J. B. WRIGHT & F. O. LAWSON.
AIR BRAKE MECHANISM.
APPLICATION FILED MAR. 28, 1913.

1,115,644.

Patented Nov. 3, 1914.
2 SHEETS—SHEET 1.

Witnesses
Halbert Brown.
Marguerite Crandell

Inventors
John B. Wright and
Frans O. Lawson
By Church & Church
Their Attorneys

J. B. WRIGHT & F. O. LAWSON.
AIR BRAKE MECHANISM.
APPLICATION FILED MAR. 28, 1913.

1,115,644.

Patented Nov. 3, 1914.
2 SHEETS—SHEET 2.

UNITED STATES PATENT OFFICE.

JOHN B. WRIGHT AND FRANS O. LAWSON, OF GREENSBORO, NORTH CAROLINA.

AIR-BRAKE MECHANISM.

1,115,644.	Specification of Letters Patent.	Patented Nov. 3, 1914.

Application filed March 28, 1913. Serial No. 757,478.

*To all whom it may concern:*

Be it known that we, JOHN B. WRIGHT and FRANS O. LAWSON, citizens of the United States, and residents of Greensboro, in the county of Guilford and State of North Carolina, have invented certain new and useful Improvements in Air-Brake Mechanism; and we do hereby declare the following to be a full, clear, and exact description thereof, reference being had to the accompanying drawings, forming part of this specification, and to the figures and letters of reference marked thereon.

This invention relates to brake mechanism for railway vehicles, and more especially to mechanism for automatically setting the brakes of such a vehicle when any abnormal displacement of the vehicle trucks with relation to the body of the vehicle occurs, as, for example, by the displacement which would occur by a partial or complete derailment of the truck.

One of the principal objects of the invention is to provide an exceedingly simple and efficient mechanism for bleeding the train pipe to thereby set the brakes when the truck is moved abnormally or beyond the safety limit in any direction, either vertically, horizontally, or otherwise and the invention therefore consists, broadly, in valve operating or opening mechanism which will be moved in a direction which will operate to open or move the valve through movement imparted to it by displacement of the truck in any direction.

Figure 1:
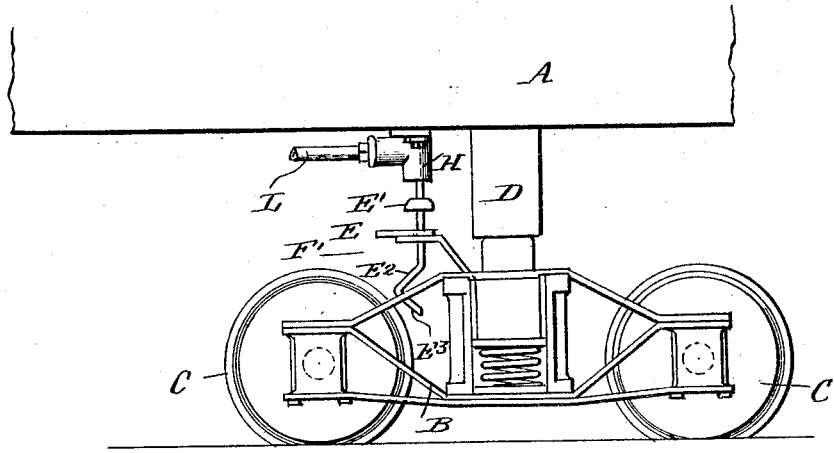
Figure 2:
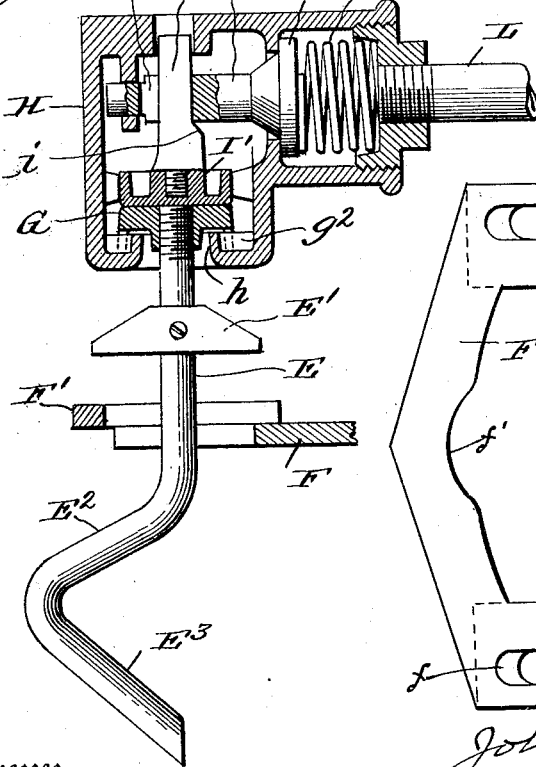
Figure 3:
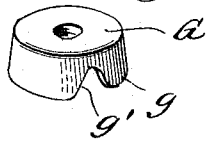
Figure 4:
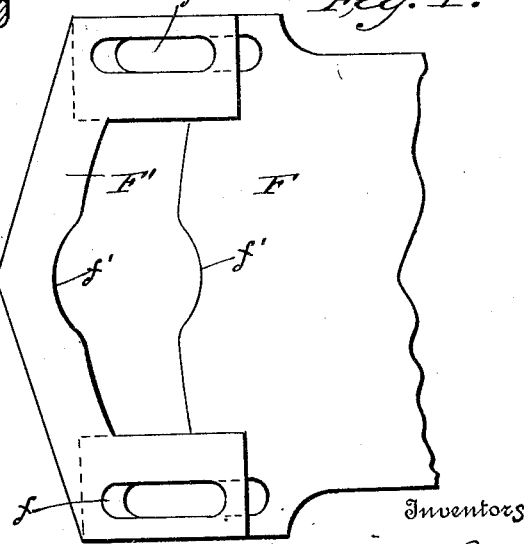
Figure 5:
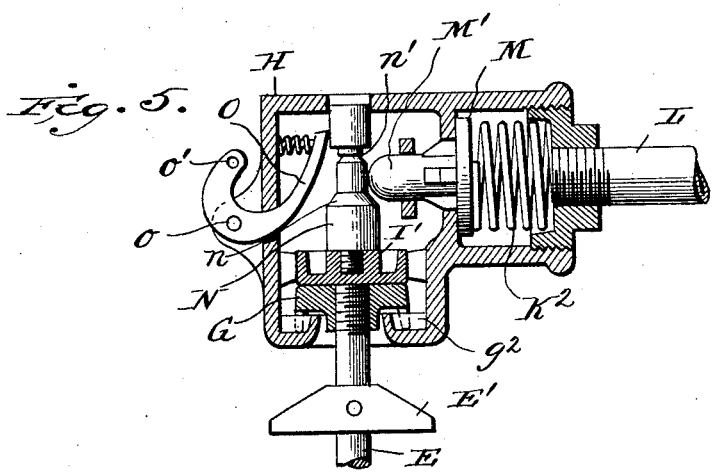
Figure 6:
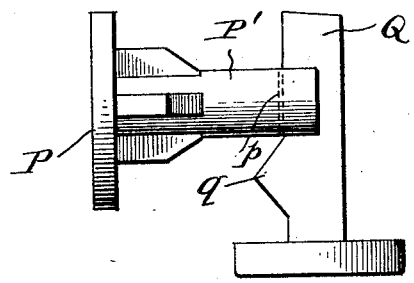
Figure 7:
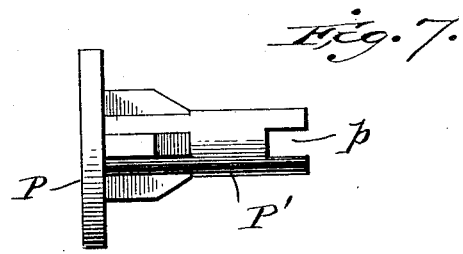

Referring to the accompanying drawings:—Figure 1 is a fragmentary side elevation illustrating one end of a car body with its truck more or less diagrammatically shown and with a brake controlling mechanism embodying the present improvements. Fig. 2 is a detail enlarged sectional view through the brake controlling mechanism shown in elevation in Fig. 1. Fig. 3 is a detail perspective view of the head of the operating rod. Fig. 4 is a top plan view of the adjustable member with which the operating rod coöperates. Fig. 5 is a section corresponding to the section in Fig. 2, but illustrating a modified arrangement of the valve mechanism. Fig. 6 is a side elevation of the moving parts of a second modification of the valve. Fig. 7 is a top plan view of the valve illustrated in Fig. 6.

Like letters of reference in the several figures indicate the same parts.

A portion of the car body is indicated in Fig. 1 at A, the truck frame at B, and the wheels of the truck frame at C. The truck frame is of course pivotally connected with the car body A through the king bolt and bolster indicated at D, and the usual appliances are provided for permitting of a limited relative movement of the truck frame and car body for turning curves as well as the necessary or desirable spring action to relieve jars due to roughness of the tracks or roadbed.

The present invention, like those of the class to which it relates, embodies a part adapted to be mounted on or carried by the car body and a coöperating part adapted to be mounted on or carried by the bolster, a suitable loose connection being provided whereby all normal movements of the truck frame with relation to the body are permitted without causing any operation of the brake controlling devices, but whereby abnormal movements will set such devices in operation. In accordance with the present invention, relative abnormal movements either up, down, laterally or longitudinally of the car will effect the operation of the brake controlling devices, and in accomplishing this result, the controlling devices are primarily operated by a rod or depending member E which extends through an opening formed by a pair of relatively movable or adjustable plate like members F and F', said rod or depending member having above the plates F, F', a cross piece E', which, if brought into contact with said members F, F' will arrest the further downward movement of the depending member or elevate the same with relation to the car body, and below said members F, F' it is provided with an incline or inclined portion $E^2$, which by contact with the plate-like members, as by relative downward movement of the members, will cause a lateral deflection of the depending member. Lateral or longitudinal relative abnormal movements will bring the depending member into contact with the walls of the opening through which it projects, thereby moving the depending member in one direction or the other.

The depending member E is provided at its upper end with a head or enlargement

G which is adapted to seat within a housing H secured to the car body, and preferably on an upwardly extending flange $h$ which surrounds the opening through which the depending member projects. Provision is made for preventing the rotation or angular movement of the depending member on its longitudinal axis as by providing the head G with a depending flange $g$ having notches $g'$ therein, as shown in Fig. 3, for coöperation with projections $g^2$, Fig. 2, located within the casing H.

Resting on the head G of the depending member is the reversely arranged head I′ of a valve actuating member or stem I which is guided vertically in suitable bearings in the housing H and provided with an incline $i'$ adapted to coöperate with a valve stem K to unseat or open a valve K′ for controlling the escape of air from the train pipe L. Preferably the actuating member I passes through a slot $k$ in the valve stem, and its operative faces beyond each end of the incline $i$ are preferably arranged in planes at right angles to the movement of the valve, whereby when the actuating member is moved upwardly the valve K′ will be opened against the tension of its spring K$^2$, and will be held in its open position by the engagement of the face of the actuating member beyond the incline, thus allowing the train pipe pressure to escape freely and holding the valve open until such time as the parts are restored to normal position by manual manipulation. The two heads G and I′, it will be noted from Fig. 2, seat squarely against each other and consequently a movement of the depending member laterally in any direction will result in elevating the actuating member, and a similar result will be effected by an upward movement of the depending member with relation to the housing H, so that it is impossible for an abnormal movement to take place in any direction without causing the actuating member to unseat the valve and thereby apply the brakes.

In devices of this kind, where a depending member is employed, it has been found that should occasion require the jacking up of the car body so as to release the trucks, when the parts are returned to their normal positions, there is danger of the depending member being caught on the plate-like coöperating members, resulting in destruction of the device. To avoid this contingency, the lower end of the depending member is made to project at a point which is in substantial alinement with the longitudinal axis of the member, as, for example, by bringing the end below the incline E$^2$ back to the center line as at E$^3$ in Fig. 2. With this construction the end of the depending member will always enter the opening designed for the reception of said member and as the car body is returned to its normal position with relation to the truck, the said depending member will pass down through said opening as will be readily understood.

The adjustable opening left between the plate-like members F and F′ is more or less arc-shaped, inasmuch as the normal movements of the truck with relation to the car are around the king bolt as a center, but the size of said opening is sufficient to permit of all normal movements laterally, longitudinally and vertically, without causing the walls of the opening to strike the depending member. A sufficient space is left between the shoulders formed by the cross bar E′ and the incline E$^2$ to permit of all normal relatively vertical movements of the parts, but any abnormal relative movement in this direction will cause either the incline F$^2$ to strike the plate-like members and deflect the depending member or the cross bar E′ to strike said plate-like members and effect a relative upward movement of the depending member, any of such movements resulting, as before stated, in the opening of the valve and the setting of the brakes.

Obviously the type of valve and its actuator may be considerably varied without departing from the present invention, and, as examples, we have illustrated in Figs. 5, 6 and 7, two modifications.

In Fig. 5 the valve M which controls the discharge opening for the train pipe is provided with a short stem M′ rounded at its end and adapted for coöperation with a round or spindle-like actuator stem N. The actuator stem N is provided with an incline $n$ for opening the valve and with shoulders $n'$ with which a spring-pressed pawl O is adapted to coöperate for holding the actuator elevated after it has been lifted by the operation of the depending member E in the manner described in connection with Fig. 2. The end of the pawl O extends to the outside of the casing where it is pivotally connected with the casing at $o$ and provided with an eye $o'$ or other suitable means for attachment of a release chain or rod of ordinary construction.

In Figs. 6 and 7 the valve P is provided with a straight stem P′ having a slot $p$ in its rear end in which a sliding actuator Q is adapted to operate, said actuator having a tooth-like projection $q$, the inclined face of which serves to open the valve and the point of which by entering the slot and resting against the flat face formed by the bottom of the slot serves to hold the valve open until the actuator is depressed by suitable manual means or otherwise, as desired.

The two parts F and F′ which form the member for coöperating with the valve operating rod are adjustably connected together by bolts passing through the slots $f$ whereby the size of the opening may be varied in accordance with the desired permissible normal relative movements of the car body and truck. It is also preferred that each plate-like member shall have a central recess $f'$ as the permissible range of relative movement is greater when the car body and truck are in alinement than when the truck is turned as in passing a curve.

Having thus described our invention, what we claim as new and desire to secure by Letters Patent of the United States, is:

1. In a derailment controlling mechanism for railway brakes, the combination with the valve, on the car body, an actuator therefor, and a depending member movable laterally in any direction or vertically to move the actuator and open the valve, of a member mounted on the bolster and coöperating with the depending member to move the depending member laterally by relative abnormal movement of the truck frame and vertically by relative abnormal vertical movement of the truck frame.

2. In a derailment controlling mechanism for railway brakes, the combination with the valve on the car body and a pendent operating member movable laterally in any direction and vertically to operate the valve, of a second operating member mounted on the bolster and loosely encircling the pendent member, said pendent member having lateral projections thereon whereby it will be displaced by abnormal relative movements of the truck either vertically or horizontally.

3. In a derailment controlling mechanism for railway brakes, the combination with the valve on the car body and an operating member movable longitudinally or laterally in any direction to open the valve, of an operating member mounted on the bolster and loosely encircling the first mentioned member and a transverse shoulder and an incline on said first mentioned member, whereby relative abnormal movement in any direction will operate the valve.

4. In a derailment controlling mechanism for railway brakes, the combination with the valve on the car body and an operating member pivotally supported to swing laterally in any direction to open the valve and also movable longitudinally to open the valve, said member having a lateral shoulder and an incline thereon, of a second operating member on the bolster and loosely encircling the first mentioned member intermediate the shoulder and incline, whereby abnormal relative movement in any direction will open the valve.

5. In a derailment controlling mechanism for railway brakes, the combination with the valve on the car body and a pendent operating member pivotally supported near its upper end to swing laterally in any direction to open the valve and also movable longitudinally to open the valve, said member having a transverse projection and an inclined face below said projection, of a second operating member mounted on the bolster and loosely encircling the first mentioned member intermediate the transverse projection and incline, whereby abnormal relative movement in any direction will open the valve.

6. In a derailment controlling mechanism for railway brakes, the combination with the valve on the car body and a pendent operating member pivotally supported at its upper end to swing laterally in any direction to open the valve, and also movable longitudinally to open the valve, said member having a lateral shoulder and an inclined face below said shoulder, of a second operating member mounted on the bolster and having an elongated opening therein in which the first mentioned member is loosely embraced at a point between the shoulder and inclined face, and means for preventing rotary movement of the pendent member on its longitudinal axis.

7. In a derailment controlling mechanism for railway brakes, the combination with the valve on the car body and a pendent operating member pivotally supported to swing laterally in any direction to open the valve, said member having near its lower end a transversely extending incline, of a second member mounted on the bolster and loosely encircling the pendent member above said incline, whereby relative upward movement of the pendent member will cause the same to be swung laterally by the engagement of the said incline with the second mentioned member.

8. In a derailment controlling mechanism for railway brakes, the combination with the valve on the car body and a pendent operating member pivotally supported at its upper end to swing laterally in any direction to open the valve, the lower portion of said pendent member being formed with a laterally projecting incline and the lower extremity of said member below said incline being located substantially in line with the longitudinal axis of the member, and a second operating member mounted on the bolster and loosely encircling the pendent member above the incline, whereby relative vertical movement of the pendent member will cause the same to be swung laterally to open the valve and said member will be guided into its proper position, should the parts become separated by such vertical movement.

9. In a derailment controlling mechanism for railway brakes, the combination with the valve on the car body movable horizontally to open the train pipe, a vertically movable actuator having an incline thereon for coöperation with the valve to open the latter, said actuator having an enlarged head at its lower end, of a pendent operating member having an enlarged head pivotally supported on a circular seat below the head of the actuator and adapted to support and operate said actuator.

10. In a derailment controlling mechanism for railway brakes, the combination with the valve on the car body movable horizontally to open the train pipe, a vertically movable actuator having an incline thereon for coöperation with the valve to open the latter, said actuator having an enlarged head at its lower end, of a pendent operating member having an enlarged head pivotally supported on a circular seat below the head of the actuator and adapted to support and operate said actuator, said pendent operating member being provided with a laterally extending incline near its lower end and a second operating member mounted on the bolster and loosely embracing the first mentioned operating member above the incline.

11. In a derailment controlling mechanism for railway brakes, the combination with the housing adapted to be secured to the car body, said housing having a train pipe valve seat therein, and an aperture for the entrance of a valve operating member with an inwardly projecting flange around said aperture, of a spring pressed valve coöperating with the valve seat, a valve operating member mounted loosely in said aperture and having an enlarged head seating on said flange and itself having a flange extending down around the flange on the housing, and means whereby when the operating member is swung laterally in any direction the valve will be unseated to permit of the escape of train pipe pressure.

12. In a derailment controlling mechanism for railway brakes, the combination with the valve on the car body, and a pendent operating member pivotally supported at its upper end to swing laterally in any direction to open the valve, and also movable longitudinally to open the valve, said member having a lateral shoulder and below said shoulder a double incline whereby the extremity of the member is brought into substantial alinement with the longitudinal axis of the member, of a second operating member mounted on the bolster, and provided with an elongated opening in which the pendent member is loosely embraced between the shoulder and inclines, and means for preventing rotation of the pendent member on its longitudinal axis.

13. In a derailment controlling mechanism for railway brakes, a brake controlling valve, and an operating rod for said valve, of an operating member loosely embracing said rod and formed of members adjustably connected whereby the size of the opening for the rod may be varied, said members having their adjacent edges shaped to form an elongated opening to permit of normal turning movements of the truck frame, each of said edges being cut away centrally to form an enlargement at the center of the opening to permit of a greater range of relative movement when the body and truck frame are in alinement.

14. In a derailment controlling mechanism for railway brakes, a brake controlling valve and an operating rod for said valve mounted on the car body, of an operating member loosely embracing the rod and mounted on the bolster, said member having an elongated opening therein to permit of the normal turning movements of the truck frame and said opening having a central enlargement to permit of a greater range of normal relative movement of the body and truck frame when in alinement than when turning a curve.

JOHN B. WRIGHT.
FRANS O. LAWSON.

Witnesses:
N. G. WHITZ,
O. L. GRUBBS.